(12) United States Patent
Dickson et al.

(10) Patent No.: US 10,400,686 B2
(45) Date of Patent: Sep. 3, 2019

(54) METHOD OF DETERMINING AIR CHARGING SYSTEM DEFICIENT STATE OF HEALTH DURING PART LOAD OPERATION

(71) Applicant: GM GLOBAL TECHNOLOGY OPERATIONS LLC, Detroit, MI (US)

(72) Inventors: Steven G Dickson, White Lake, MI (US); Jordan D Weaver, Wixom, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 406 days.

(21) Appl. No.: 15/292,739

(22) Filed: Oct. 13, 2016

(65) Prior Publication Data

US 2018/0106202 A1    Apr. 19, 2018

(51) Int. Cl.
| | | |
|---|---|---|
| *F02D 41/00* | (2006.01) | |
| *F02D 41/02* | (2006.01) | |
| *F02D 41/14* | (2006.01) | |
| *F02D 41/22* | (2006.01) | |
| *F02M 35/10* | (2006.01) | |
| *F02D 35/02* | (2006.01) | |
| *F02D 29/04* | (2006.01) | |
| *F02B 29/04* | (2006.01) | |

(52) U.S. Cl.
CPC ......... *F02D 41/0007* (2013.01); *F02B 29/04* (2013.01); *F02D 35/028* (2013.01); *F02D 41/0002* (2013.01); *F02D 41/0025* (2013.01); *F02D 41/023* (2013.01); *F02D 41/1479* (2013.01); *F02D 41/22* (2013.01); *F02M 35/1038* (2013.01); *F02D 2200/0406* (2013.01); *F02D 2200/101* (2013.01); *F02D 2200/1002* (2013.01); *F02D 2200/703* (2013.01); *F02D 2250/08* (2013.01); *Y02T 10/144* (2013.01); *Y02T 10/146* (2013.01); *Y02T 10/42* (2013.01)

(58) Field of Classification Search
CPC ........ F02D 41/22; F02D 41/26; F02D 41/262; F02D 41/266; F02B 29/04; F01P 2031/00
See application file for complete search history.

(56) References Cited

U.S. PATENT DOCUMENTS

| | | | | |
|---|---|---|---|---|
| 7,098,779 B2 * | 8/2006 | Pontius | ................... | F02B 77/04 |
| | | | | 123/339.16 |
| 2016/0084176 A1 * | 3/2016 | Yokono | ............... | F02D 41/0007 |
| | | | | 123/564 |
| 2016/0103032 A1 * | 4/2016 | Nakano | ................... | F02D 41/22 |
| | | | | 73/112.01 |
| 2016/0153367 A1 * | 6/2016 | Yoon | ................... | F02B 29/0493 |
| | | | | 701/102 |
| 2016/0169100 A1 * | 6/2016 | Hanawa | .................. | F02B 29/04 |
| | | | | 73/114.68 |
| 2016/0251995 A1 * | 9/2016 | Tsunooka | ................ | F01N 3/021 |
| | | | | 701/33.7 |
| 2018/0202349 A1 * | 7/2018 | Kindl | .................. | F02B 29/0475 |

FOREIGN PATENT DOCUMENTS

| | | | | | |
|---|---|---|---|---|---|
| EP | 1201890 A1 * | 5/2002 | | ............. | F01P 11/16 |
| JP | 2008190435 A * | 8/2008 | | ............. | F02B 29/04 |

* cited by examiner

Primary Examiner — Jason D Shanske
Assistant Examiner — Jessica L Kebea

(57) ABSTRACT

A method to diagnose post air charger compressor icing obstructions without the addition of a post compressor pressure sensor. The method detects when conditions exists for icing to occur and performs at least one icing mitigation strategy when the icing conditions exceed a predetermined icing condition threshold.

19 Claims, 2 Drawing Sheets

METHOD OF DETERMINING AIR CHARGING SYSTEM DEFICIENT STATE OF HEALTH DURING PART LOAD OPERATION

TECHNICAL FIELD

The present invention generally relates to air charger systems, and more particularly relates to a method of determining an air charging system state of health during part load operation.

BACKGROUND

In conventional air charger systems, atmospheric air enters through the air charger system for compression. Moisture is always present in atmospheric air in the form of water vapor. Moisture is also a byproduct of the combustion process of converting fuel to mechanical work output in an internal combustion engine.

The pistons in the engine, even though sealed properly, will occasionally let small amounts of fuel, air and water vapor pass into the crankcase which will collect over time. These crankcase gases are vented through a valve to either the intake manifold or the air charger system, depending upon available vacuum.

In situations where the crankcase is vented to the air charger system, the air mixture is heated during the compression process. To increase efficiency in the combustion chamber, the heated compressed air is cooled by a heat exchanger.

In cold climates, the effects of the heat exchanger in addition to the cold ambient air sometimes causes the water vapor in the charged air to change phase and accumulate. This intake air restriction may cause the engine to not run as expected or not start at all. It is desirable to have a way to detect when such conditions may affect an air charging system's state of health, and to provide strategies to mitigate such occurrences.

Furthermore, other desirable features and characteristics of the present exemplary embodiment will become apparent from the subsequent detailed description of the embodiment and the appended claims, taken in conjunction with the accompanying drawings and this background.

BRIEF SUMMARY

One or more exemplary embodiments address the above issue by providing a method detecting and mitigating undesirable air charger system conditions. More particularly, apparatuses consistent with exemplary embodiments relate to a method of determining an air charging system deficient state of health during part load operation.

According to an aspect of an exemplary embodiment, a method of determining a air charging system's deficient state of health during engine part load operation includes detecting if the engine is operating at a steady state condition. Still another aspect as according to the exemplary embodiment includes detecting if an air charger system deficient state of health condition exists when the engine is operating at a steady state condition. And another aspect includes calculating charge air cooler pressure based on engine speed, manifold pressure and barometric pressure when air charger system deficient state of health conditions exists.

Another still aspect of the exemplary embodiment includes comparing the calculated charge air cooler pressure to a measured charge air cooler pressure. Yet further aspects include starting a deficient state of health condition timer when a difference between the calculated charge air cooler pressure and the measured charge air cooler pressure is greater than a predetermined charge air cooler pressure threshold and performing at least one mitigation strategy when the deficient state of health condition timer is greater than a predetermined timer threshold. Another aspect in accordance with the exemplary embodiment wherein the deficient state of health condition is cause by an icing condition.

Yet another aspect of the exemplary embodiment includes detecting that a positive crankcase ventilation valve (PCV) routing path flows into the air charger system when engine manifold air pressure (MAP) is greater than a predetermined MAP pressure threshold. And still another aspect in accordance with the embodiment wherein the positive crankcase ventilation valve routes gases into the air charger system. Another aspect in accordance with the embodiment wherein comparing charge air cooler pressure further comprises measuring charge air pressure with an air pressure sensor.

Still in accordance with the exemplary embodiment wherein calculating the charge air cooler pressure further comprises sensing outlet air pressure of air charger system air compressor. Yet other aspects include calculating the engine speed based on a crankshaft position sensor signal and determining the manifold pressure based on a MAP sensor signal. And yet other aspects in accordance with the exemplary embodiment include determining the barometric pressure based on a barometric sensor signal and changing a current gear state to a lower gear state.

Other aspects in accordance with the exemplary embodiment include reducing throttle body opening when changing the gear state wherein reducing the throttle body opening is performed by an engine control module.

BRIEF DESCRIPTION OF THE DRAWINGS

The present exemplary embodiment will hereinafter be described in conjunction with the following drawing figures, wherein like numerals denote like elements.

DETAILED DESCRIPTION

The following detailed description is merely exemplary in nature and is not intended to limit the embodiment or the application and uses thereof. Furthermore, there is no intention to be bound by any theory presented in the preceding background or the following detailed description.

Figure 1:
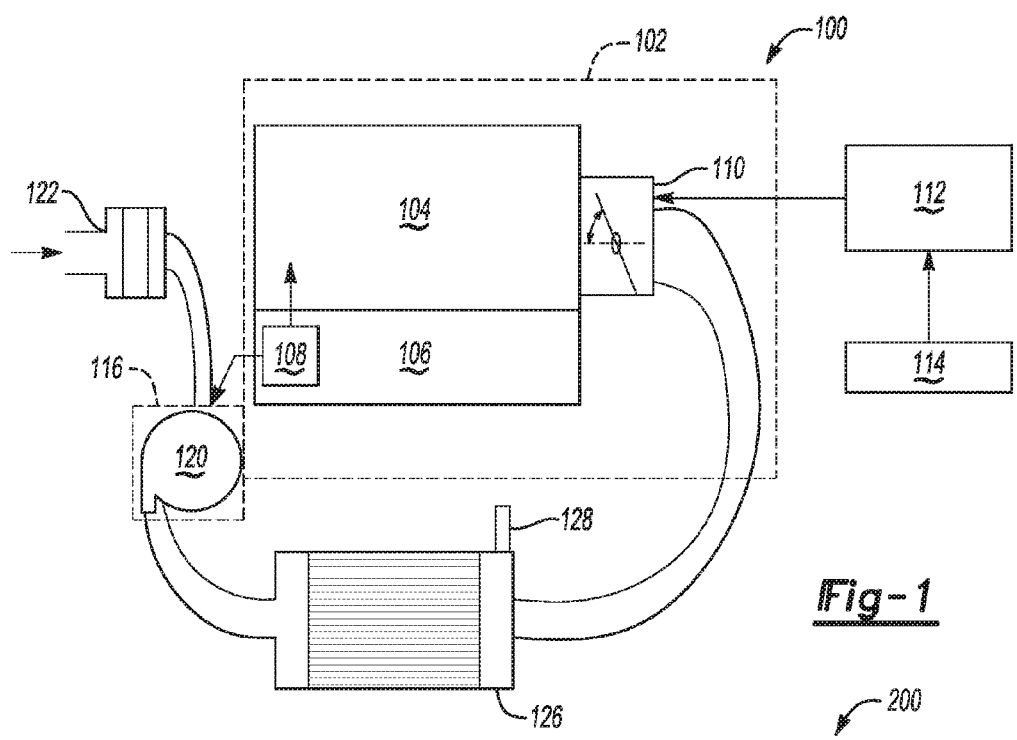
FIG. 1 is an illustration of a system diagram of an air charger system for determining an air charger system deficient state of health condition in accordance with aspects of an exemplary embodiment.

In accordance with the disclosed embodiment, FIG. 1 is an illustration of a system diagram 100 of an air charger system 116 for determining an icing condition in accordance with aspects of an exemplary embodiment. An engine 102 includes an engine intake manifold 104 and a crankcase 106. A positive crankcase ventilation valve 108 that is operative to vent gases from the crankcase 106 in either one of two routes dependent upon the pressure of the engine intake manifold pressure in accordance with the exemplary embodiment.

An engine controller unit 112 is in communication with the engine throttle body 110 and the engine intake manifold 104. The engine throttle body 110 regulates the flow of air into the engine intake manifold 104 and is operative to be controlled by the engine controller unit 112 for managing such regulation in accordance with the exemplary embodiment. Sensors 114 are in communication with the engine controller unit 112 for providing input signals representative of various vehicle parameters including such signals as a manifold air pressure signal, a barometric pressure signal, a crankshaft position signal, and various other sensor signals in accordance with the exemplary embodiment.

An air charger system 116 includes an air charger exhaust turbine 118 in mechanical communication via a shaft to a air charger compressor 120 is operative to improve the engine's volumetric efficiency by increasing density of the intake air. The air charger compressor 120 draws in ambient air from the air inlet 122 and compresses the air drawn before it enters into a charge air cooler 126. The air charger compressor 120 heats the air drawn into the air charger system 116 to a temperature that must be reduced before it can be delivered to the engine intake manifold 104 at increased pressure. A throttle intake air pressure sensor 128 is operative to sense the intake air pressure at the outlet of the charge air cooler 126 before it is drawn through the engine throttle body 110 into the engine intake manifold 104.

Figure 2:
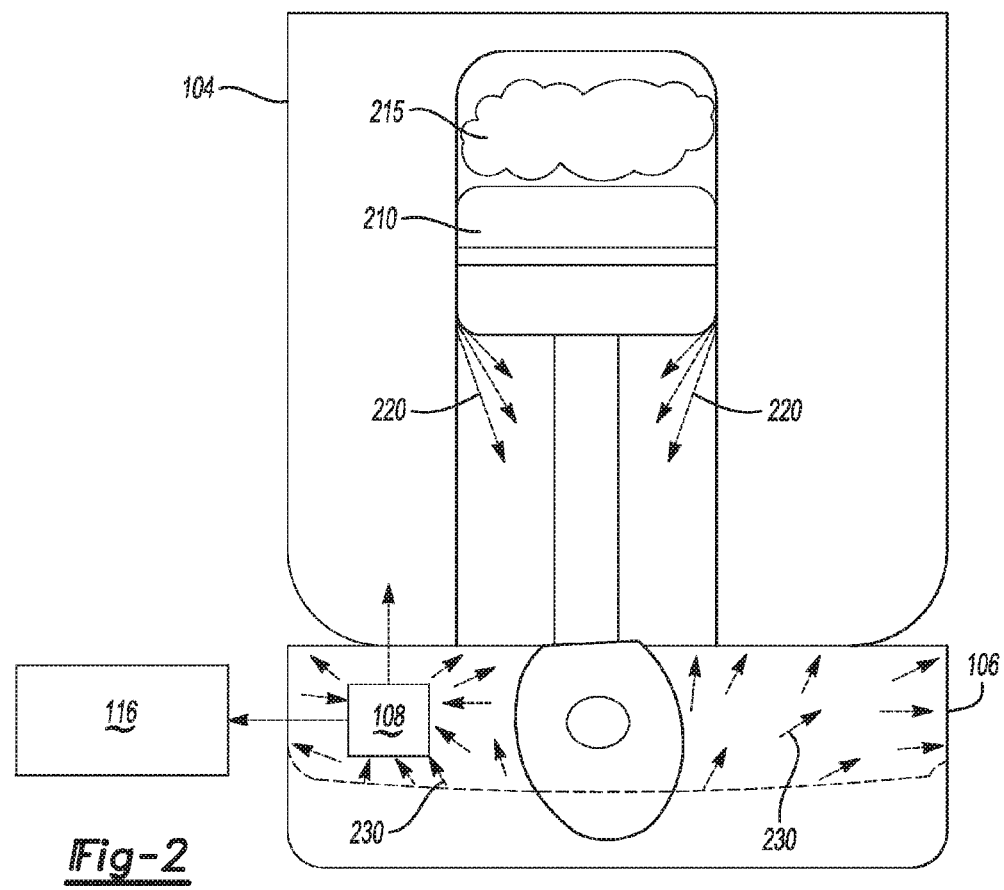
FIG. 2 is an illustration of piston combustion chamber blow by gas into a crank case in accordance with aspects of the exemplary embodiment.

Referring now to FIG. 2, an illustration 200 of piston combustion chamber blow-by gas 220 flowing into a crank case 106 in accordance with aspects of the exemplary embodiment is presented. A piston 210 compresses air-fuel mixture 215 in the combustion chamber before it is ignited. Upon compression, a small amount of the air-fuel mixture 215 will blow-by the piston rings (not shown) and be deposited into the engine crankcase 106. When the lubricating oil within the engine crankcase 106 reaches a high enough temperature to make the air-fuel mixture 220 evaporate, it causes excess gases 230 to build-up in the crankcase 106.

Below a predetermined pressure threshold, the positive crank ventilation valve 108 will vent the excess gases 230 from the crank case 106 into the engine intake manifold 104 and above the predetermined pressure threshold the positive crank ventilation valve 108 will vent the excess gases 230 from the crankcase 106 into the air charger system 116. The air charger system 116 compresses the excess gases 230 along with the drawn intake air (including water vapor) and outputs the compressed air to the charge air cooler 126. Under steady state operating conditions when the engine is operating under part load, the effects of the charge air cooler in addition to the cold climate sometimes causes the water vapor in the compressed air to condense and freeze up creating an icing condition such that intake air is restricted from entering the engine intake manifold 104 which adversely affects engine operation.

Figure 3:
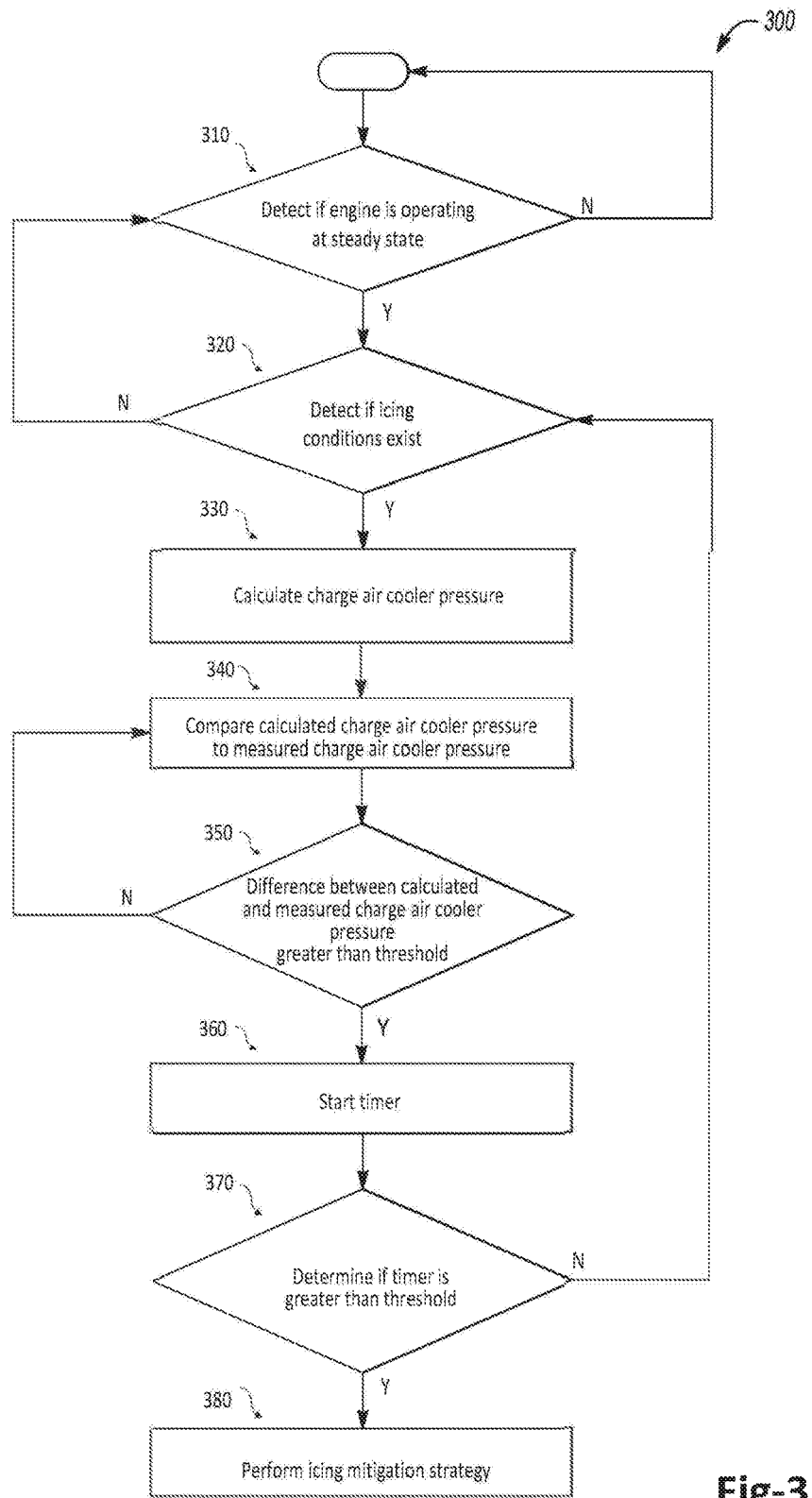
FIG. 3 is a flowchart that illustrates a method for determining an air charger system deficient state of health condition during engine part load operation in accordance with aspects of the exemplary embodiment.

Referring now to FIG. 3, an algorithm 300 that illustrates a method for determining an air charger system icing (deficient state of health) condition during engine part load operation in accordance with aspects of the exemplary embodiment is provided. At block 310, the method begins with detecting if the engine is operating at a steady state condition during part load. For example, a steady state condition during part load could be driving at a constant speed on a highway. If the engine is operating at steady state during part load then the method continues at block 320. If the engine is not operating at steady state during part load then the method starts over.

At block 320, the method continues with detecting if icing conditions exists when the engine is operating at a steady state condition during part load. Icing conditions can exist when ambient temperatures are close to, or below, 32° F. If an icing condition exist then the method continues to block 330. If an icing condition does not exist then the method returns to block 310.

At block 330, the method continues by calculating charge air cooler pressure based on engine speed, manifold pressure and barometric pressure when icing conditions exists. The equation for calculating the charge air cooler pressure in accordance with the exemplary embodiment is $P_{CAC\ Pressure} = P_{baro} + P_{Air\ charger, Est}$, where $P_{Air\ charger, Est}$ is a regression model that is a function of engine speed, MAP and barometric pressure. The engine controller unit 112 can calculate the engine speed, the manifold pressure, and the barometric pressure from signals received from a crankshaft position sensor, a manifold air pressure sensor, and a barometric pressure sensor, respectively, in accordance with aspects of the exemplary embodiment.

At block 340, the method continues with comparing the calculated charge air cooler pressure to a measured charge air cooler pressure. The throttle intake air pressure sensor 128 senses the air pressure at the outlet of the charge air cooler 126 and sends the signal to the engine controller unit 112. It is appreciated that a variety of air pressure sensors suitable for the intended purpose may be used instead of the throttle intake air pressure sensor without exceeding the scope of the exemplary embodiment. The engine controller unit 126 compares the calculated and measured charge air cooler pressure values.

At block 350, the method continues with starting a deficient state of health condition timer when a difference between the calculated charge air cooler pressure and the measured charge air cooler pressure is greater than a predetermined charge air cooler pressure difference threshold. The predetermined charge air cooler pressure difference threshold may be determined based on a statistical analysis to differentiate a nominal and an obstructed system. If the difference between the calculated charge air cooler pressure and the measure charge air cooler pressure is greater than the predetermined charge air cooler pressure threshold then the method continues at block 360 where the deficient state of health timer is started. If the difference between the calculated charge air cooler pressure and the measure charge air cooler pressure is not greater than the predetermined charge air cooler pressure threshold then the method returns to 340.

At block 370, the method continues with determining if the deficient state of health condition timer is greater than a predetermined timer threshold. In accordance with the exemplary embodiment, the predetermined timer threshold may be determined based on a statistical analysis to differentiate a nominal and an obstructed system. If the deficient state of health timer clock is greater than the predetermined timer threshold then the method continues at block 380. If the deficient state of health timer clock is not greater than the predetermined timer threshold then the method returns to block 320. It is appreciated that the deficient state of health condition timer may be integrated into or managed by the engine controller unit 112 in accordance with the exemplary embodiment.

At block 380, the method ends with performing at least one icing mitigation strategy when the deficient state of health condition timer is greater than a predetermined timer threshold. In accordance with the exemplary embodiment, an icing mitigation strategy changes the operating conditions of the engine such that PCV gases are routed to the intake manifold therefore reducing PCV gases routed to the charge air cooler system. It is appreciated that the icing condition presented above is exemplary with regard to an air charger system deficient state of health condition and is not intended to limit the scope of deficient state of health conditions of an air charger system that the exemplary method is intended to detect and mitigate.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining an air charger system deficient state of health condition during engine part load operation comprising:
   an engine;
   an intake line;
   a compressor positioned in the intake line and configured to provide compressed air to the engine;
   a charge air cooler provided in the intake line downstream of the compressor and upstream of the engine;
   a charge air cooler pressure sensor; and
   a controller, wherein the controller is configured to perform the steps of:
   detecting if the engine is operating at a steady state condition;
   detecting if the air charger system deficient state of health condition exists when the engine is operating at a steady state condition;
   calculating a charge air cooler pressure based on engine speed, intake manifold pressure and barometric pressure when the air charger deficient state of health condition exists;
   measuring a charge air cooler pressure of the charge air cooler via the charge air cooler sensor;
   comparing the calculated charge air cooler pressure to the measured charge air cooler pressure;
   starting a deficient state of health condition timer when a difference between the calculated charge air cooler pressure and the measured charge air cooler pressure is greater than a predetermined charge air cooler pressure difference threshold; and
   performing at least one mitigation strategy when the deficient state of health condition timer indicates that a period of time has elapsed which is greater than a predetermined timer threshold.

2. The method of claim 1 wherein the air charger system deficient state of health condition is caused by icing.

3. The method of claim 1 wherein detecting the air charger system deficient state of health condition further comprises detecting that a positive crankcase ventilation gas flows into the intake line via a positive crankcase ventilation line.

4. The method of claim 3 wherein the positive crankcase ventilation pas flows into the intake line via the positive crankcase ventilation line when engine manifold air pressure (MAP) is greater than a predetermined MAP pressure threshold.

5. The method of claim 4 wherein the positive crankcase ventilation line comprises a valve to selectively admit positive crankcase ventilation gas into the intake line.

6. The method of claim 1 wherein the step of calculating the charge air cooler pressure is further based on an outlet air pressure of the compressor.

7. The method of claim 1 wherein the step of calculating the charge air cooler pressure is further based on the engine speed from a crankshaft position sensor signal.

8. The method of claim 1 wherein the step of calculating the charge air cooler pressure is further based on the intake manifold pressure from a MAP sensor signal.

9. The method of claim 1 wherein the step of calculating the charge air cooler pressure is further based on the barometric pressure from a barometric sensor signal.

10. The method of claim 1 wherein the step of performing the at least one mitigation strategy further comprises changing a current gear state to a lower gear state.

11. The method of claim 10 wherein the step of changing the current gear to the lower gear state further comprises reducing a throttle body opening.

12. The method of claim 4 wherein the air charger system deficient state of health condition is caused by icing.

13. The method of claim 4 wherein the positive crankcase ventilation line comprises a valve to selectively admit positive crankcase ventilation gas into the intake line.

14. The method of claim 4 wherein the step of calculating the charge air cooler pressure is based on an outlet air pressure of the compressor.

15. The method of claim 4 wherein the step of performing the at least one mitigation strategy further comprises changing a current gear state to a lower gear state.

16. The method of claim 4 wherein the step of changing the current gear state to the lower gear state further comprises reducing a throttle body opening.

17. The method of claim 4 wherein the step of calculating the charge air cooler pressure is further based on the barometric pressure from a barometric sensor signal.

18. The method of claim 4 wherein the step of calculating the charge air cooler pressure is further based on the engine speed from a crankshaft position sensor signal.

19. A system comprising:
   an engine;
   an intake line;
   a compressor positioned in the intake line and configured to provide compressed air to the engine;
   a charge air cooler provided in the intake line downstream of the compressor and upstream of the engine;
   a charge air cooler pressure sensor; and
   a controller, wherein the controller is configured to perform the steps of:
   detecting if the engine is operating at a steady state condition;
   detecting if an air charger system deficient state of health condition exists when the engine is operating at a steady state condition;

calculating a charge air cooler pressure based on engine speed, intake manifold pressure and barometric pressure when the air charger deficient state of health condition exists;

measuring a charge air cooler pressure of the charge air cooler via the charge air cooler sensor;

comparing the calculated charge air cooler pressure to the measured charge air cooler pressure;

starting a deficient state of health condition timer when a difference between the calculated charge air cooler pressure and the measured charge air cooler pressure is greater than a predetermined charge air cooler pressure difference threshold; and performing at least one mitigation strategy when the deficient state of health condition timer indicates that a period of time has elapsed which is greater than a predetermined timer threshold.

\* \* \* \* \*